United States Patent
Hahn et al.

(10) Patent No.: US 7,734,501 B2
(45) Date of Patent: Jun. 8, 2010

(54) METHOD OF SELLING COMMODITIES AND SHARING SALES PROFITS USING INTERNET

(75) Inventors: Soon-Jong Hahn, Seoul (KR); Shin Hahn, Seoul (KR)

(73) Assignee: SK Chemicals Co., Ltd., Suwon (KR)

( * ) Notice: Subject to any disclaimer, the term of this patent is extended or adjusted under 35 U.S.C. 154(b) by 875 days.

(21) Appl. No.: 10/547,107

(22) PCT Filed: Feb. 24, 2004

(86) PCT No.: PCT/KR2004/000380

§ 371 (c)(1),
(2), (4) Date: Nov. 9, 2006

(87) PCT Pub. No.: WO2004/077329

PCT Pub. Date: Sep. 10, 2004

(65) Prior Publication Data

US 2007/0136074 A1  Jun. 14, 2007

(30) Foreign Application Priority Data

Feb. 27, 2003  (KR) .................... 10-2003-0012304

(51) Int. Cl.
    *G06Q 30/00* (2006.01)
(52) U.S. Cl. .................. 705/14.17; 705/35; 705/36 R
(58) Field of Classification Search ............. 705/14, 705/14.17, 35, 36 R
    See application file for complete search history.

(56) References Cited

U.S. PATENT DOCUMENTS

| | | | | |
|---|---|---|---|---|
| 5,970,470 A | * | 10/1999 | Walker et al. | 705/14.27 |
| 6,049,778 A | * | 4/2000 | Walker et al. | 705/14.14 |
| 2001/0027413 A1 | * | 10/2001 | Bhutta | 705/14 |
| 2003/0172015 A1 | * | 9/2003 | Griffin | 705/35 |
| 2004/0122736 A1 | * | 6/2004 | Strock et al. | 705/14 |
| 2004/0249703 A1 | * | 12/2004 | Weiszfeiler | 705/14 |

FOREIGN PATENT DOCUMENTS

| | | |
|---|---|---|
| KR | 2001-67909 | 7/2001 |
| KR | 2001-69267 | 7/2001 |
| KR | 2001-93493 | 10/2001 |

OTHER PUBLICATIONS

Leibson, Beth. "Buying Contracts Deliver the Goods, and Hefty Discounts Too". Facilities Design & Management. Apr. 1991.*
Wikipedia page describing "dividend" dated Dec. 2002.*

* cited by examiner

*Primary Examiner*—Michael Bekerman
(74) *Attorney, Agent, or Firm*—Jordan and Hamburg LLP

(57) ABSTRACT

The present invention relates, in general, to a method of selling commodities and sharing sales profits using the Internet and, more particularly, to a method of selling commodities and sharing sales profits using the Internet, which not only allows a commodity purchaser to give a predetermined deposit to a commodity seller, to purchase commodities at low prices, and to be issued both a dividend and an award for contribution previously stipulated by the commodity seller, depending on the contribution level of the amount spent purchasing commodities and the deposit after a predetermined period has elapsed, but also allows the commodity seller to finance a business using funds obtained on the basis of the credit thereof, thus maintaining continuous business relations between the commodity purchaser and the commodity seller.

6 Claims, 5 Drawing Sheets

FIG. 3

| ANTICIPATED COMMODITY PURCHASE AMOUNT | DESIRED DEPOSIT AMOUNT |
|---|---|
| TWO MILLION WON | TWO MILLION WON |
| FIVE MILLION WON | TEN MILLION WON |
| TEN MILLION WON | TWENTY MILLION WON |
| TWENTY MILLION WON | FORTY MILLION WON |
| ⋮ | ⋮ |

FIG. 4

| ACCUMULATED COMMODITY PURCHASE AMOUNT(AC) | DISCOUNT RATES |
|---|---|
| AC< ONE MILLION WON | 0% |
| ONE MILLION WON ≤ AC < TWO MILLION WON | 3% |
| TWO MILLION WON ≤ AC < FIVE MILLION WON | 5% |
| FIVE MILLION WON < AC | 10% |
| ⋮ | ⋮ |

METHOD OF SELLING COMMODITIES AND SHARING SALES PROFITS USING INTERNET

TECHNICAL FIELD

The present invention relates, in general, to a method of selling commodities and sharing sales profits using the Internet and, more particularly, to a method of selling commodities and sharing sales profits using the Internet, which not only allows a commodity purchaser to give a predetermined deposit to a commodity seller, to purchase commodities at low prices, and to be issued both a dividend and an award for contribution previously stipulated by the commodity seller, depending on the contribution level of the amount spent purchasing commodities and the deposit after a predetermined period has elapsed, but also allows the commodity seller to finance a business using funds obtained on the basis of the credit thereof, thus maintaining continuous business relations between the commodity purchaser and the commodity seller.

BACKGROUND ART

Generally, the distribution of commodities is performed in such a way that a commodity seller purchases commodities from a commodity provider at predetermined prices, and resells the commodities to purchasers at prices obtained by adding costs required to distribute, keep and sell the commodities and sales profits to the purchase prices of the commodities. Such selling of commodities has been primarily performed in retail stores, such as agents, stores, discount stores and department stores. A commodity seller makes efforts to continuously maintain transactions between commodity purchasers and the commodity seller through the use of a method of selling commodities while issuing coupons each corresponding to a certain percentage of the price of a commodity sold or applying certain discount rates to favored clients or clients purchasing a considerable number of commodities. However, such a typical selling method is problematic in that discount rates must be differently applied depending on profits generated by respective commodities, and the contribution levels of commodity purchasers for business activities cannot be precisely calculated, so that compensatory policies, such as the application of discount rates to commodity purchasers, cannot be precise and scientific. Therefore, indisputable motives for allowing the commodity purchasers to maintain business relations with the commodity seller cannot be induced. Further, in the case of the method of issuing coupons depending on the prices of commodities sold, there are problems in that it is inconvenient for each commodity purchaser to carefully manage coupons, and profits obtained by the commodity purchaser through the coupons are typically small, so that this method is not sufficient to induce continuous business relations as in the above-described case.

Recently, due to the rapid development of the Internet, electronic commerce through the Internet has been actively performed. Electronic commerce through the Internet is advantageous in that preferences and contribution levels of commodity purchasers can be precisely evaluated through member subscription and a database of sales records, as well as convenience in purchasing and selling commodities and reduction of distribution costs, and compensatory policies for preferred members due to the evaluated preferences and contribution levels are carried out, thus maintaining continuous business relations. However, such compensatory policies for preferred members or simple discounts of certain percentages of the selling prices of commodities are not sufficient to continuously guarantee profits of commodity purchasers, thus preventing continuous business relations between the commodity purchasers and the commodity seller from being reliably maintained.

DISCLOSURE OF THE INVENTION

Accordingly, the present invention has been made keeping in mind the above problems occurring in the prior art, and an object of the present invention is to provide a method of selling commodities and sharing sales profits using the Internet, which allows a commodity seller to share suitable sales profits to commodity purchasers in on-line, thus maintaining continuous business relations between the commodity purchasers and the commodity seller:

Another object of the present invention is to provide a method of selling commodities and sharing sales profits using the Internet, which receives predetermined deposits from commodity purchasers through the Internet, evaluates the contribution levels of the deposits of the commodity purchasers depending on the amount of money obtained by selling commodities and/or the amount spent purchasing commodities by the commodity purchasers, and then informs the commodity purchasers of the evaluated contribution levels in real time, thus improving commodity purchasing rates or participating rates of members.

A further object of the present invention is to provide a method of selling commodities and sharing sales profits using the Internet, which can be utilized as an investing means suitable for the actual conditions of commodity purchasers in on-line.

In order to accomplish the above and other objects, the present invention provides a method of selling commodities and sharing sales profits, in which an Internet managing system of a commodity seller for electronic commerce is connected to terminals of both at least one commodity purchaser and the commodity seller to sell commodities and to share sales profits obtained from sold commodities to the commodity purchaser, comprising the steps of a) the commodity purchaser accessing the Internet managing system of the commodity seller through the Internet to apply for member subscription and enter a desired deposit amount corresponding to an anticipated amount to be spent purchasing commodities for a predetermined period, with reference to various stipulations and information related to member subscription and deposits guided through a home page provided by the commodity seller; b) the Internet managing system of the commodity seller approving member subscription of the commodity purchaser by examining qualifications thereof through the Internet, informing the commodity purchaser of approval of the member subscription in real time through a mail server, requesting the commodity purchaser to give the desired deposit amount as a deposit, and automatically transferring the deposit to an account of the commodity seller; c) the commodity purchaser accessing the Internet managing system to purchase commodities provided by the commodity seller for a predetermined stipulated period; and d) the Internet managing system of the commodity seller issuing to the commodity purchaser a dividend of sales profits corresponding to a predetermined dividend rate according to purchase of commodities on the basis of a smaller one of an actual amount spent purchasing commodities and an anticipated amount to be spent purchasing commodities, as a refund, after the stipulated period initially set by the commodity purchaser through the Internet has elapsed, and issuing to the commodity purchaser an award for contribution corresponding to a predetermined coverage ratio of a difference between the actual amount spent purchasing commodities and the anticipated amount to be spent purchasing commodities with respect to the difference.

Preferably, the stipulated period for which commodities are purchased may be one year.

Preferably, the step d) may comprise the step of differently applying discount rates at the time of purchasing commodities depending on an accumulated amount spent purchasing commodities by the commodity purchaser for a predetermined period.

Preferably, the step d) may comprise the steps of determining whether the actual amount (A) spent purchasing commodities is equal to or greater than the anticipated amount (B) to be spent purchasing commodities; issuing to the commodity purchaser a dividend of sales profits, calculated depending on a predetermined dividend rate (X) with respect to the anticipated amount (B) to be spent purchasing commodities, as a refund, and issuing to the commodity purchaser an award for contribution to excess purchases, calculated according to a predetermined excess purchase coverage ratio (Y) with respect to an actual amount exceeding the anticipated amount (B) to be spent purchasing commodities, if the actual amount (A) spent purchasing commodities is equal to or greater than the anticipated amount (B) to be spent purchasing commodities; and issuing to the commodity purchaser a dividend of sales profits, calculated depending on a predetermined dividend rate (X) with respect to the actual amount (A) spent purchasing commodities, as a refund, and issuing to the commodity purchaser an award for contribution to the deposit, calculated according to a predetermined deposit coverage ratio (Z) with respect to an anticipated amount exceeding the actual amount (A) spent purchasing commodities, if the actual amount (A) spent purchasing commodities is less than the anticipated amount (B) to be spent purchasing commodities.

Preferably, the deposit coverage ratio (Z) may be greater than the excess purchase coverage ratio (Y).

Preferably, the step d) may comprise the step of updating details of member subscriptions of the commodity purchaser to maintain business relations between the commodity seller and the commodity purchaser.

BRIEF DESCRIPTION OF THE DRAWINGS

The above and other objects, features and other advantages of the present invention will be more clearly understood from the following detailed description taken in conjunction with the accompanying drawings, in which:

FIG. 3 is a view showing a relationship between the anticipated amount to be spent purchasing commodities and the desired deposit amount, which are applied to the method of selling commodities and sharing sales profits using the Internet according to the present invention;

FIG. 4 is a view showing a relationship between the accumulated amount spent purchasing commodities and discount rates, which are applied to the method of selling commodities and sharing sales profits using the Internet according to the present invention;

BEST MODE FOR CARRYING OUT THE INVENTION

Hereinafter, embodiments of the present invention will be described in detail with reference to the attached drawings.

Figure 1:
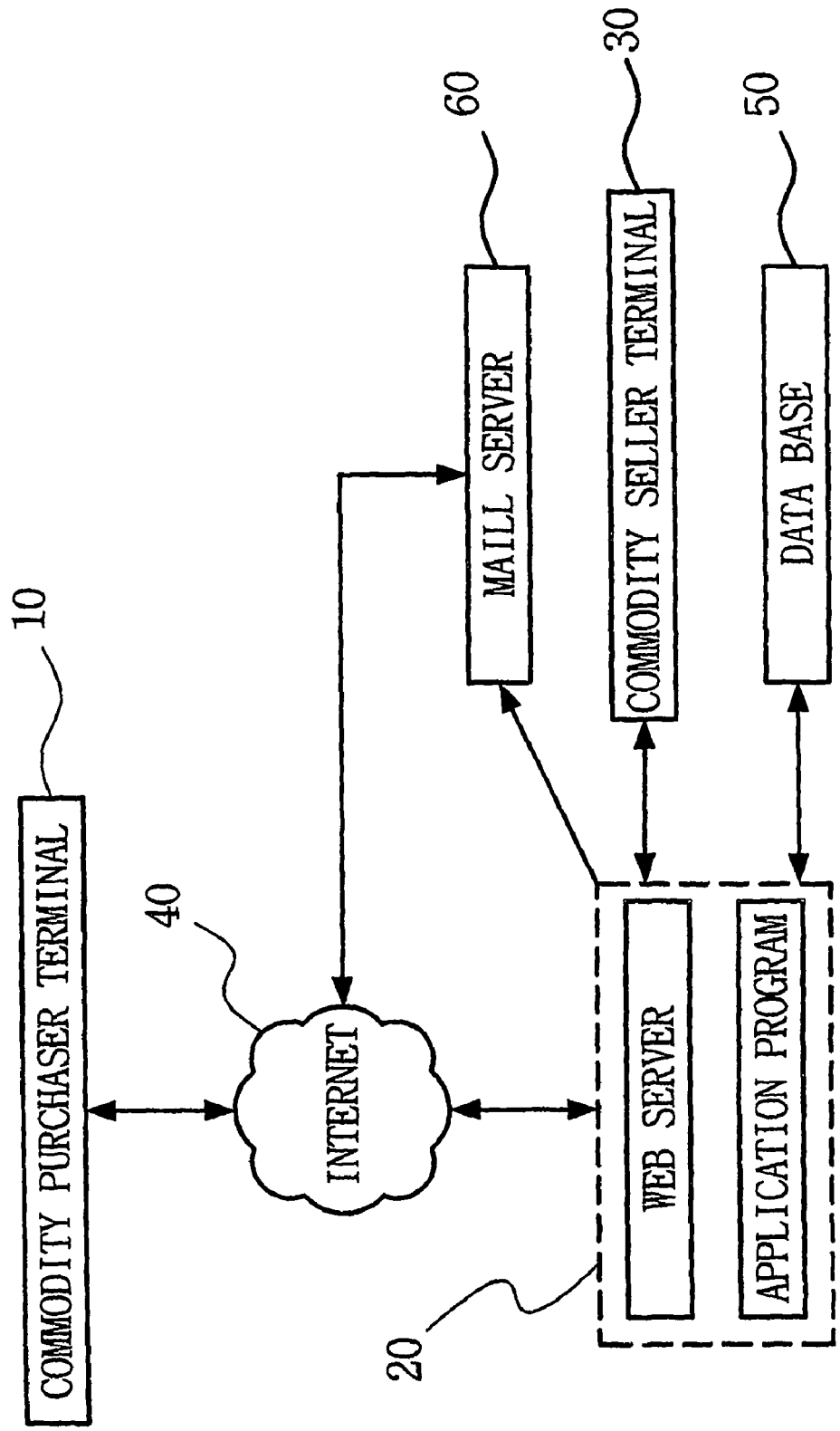
FIG. 1 is a view showing the configuration of an on-line system for implementing a method of selling commodities and sharing sales profits using the Internet according to an embodiment of the present invention.

FIG. 1 is a view showing the configuration of an on-line system for implementing a method of selling commodities and sharing sales profits using the Internet according to an embodiment of the present invention. The on-line system of FIG. 1 may be implemented as a generally used Internet system, and may comprise a commodity purchaser terminal 10, an Internet managing system 20 of a commodity seller, a commodity seller terminal 30, and the Internet 40. If necessary, the on-line system may further comprise a separate database 50, a mail server 60 and the like. The commodity purchaser terminal 10, the Internet managing system 20 and the commodity seller terminal 30 are configured so that they are connected on-line to each other through various communication networks, preferably, a PC communication network or the Internet 40, to mutually exchange information thereamong in real time.

The Internet managing system 20 controls an entire process of the present system while providing a home page of the commodity seller, and includes an application program and a Web server for managing a commodity purchaser, that is, a client or member, selling commodities, paying for the commodities, and evaluating sales profits for the commodities. The Internet managing system 20 may be connected to the database 50 for storing therein records of information, such as member profile information, commodity information, sales record information of commodities and sales profit information. The commodity purchaser terminal 10 is used to allow the commodity purchaser to access the Internet managing system 20 through the Internet 40, apply for member subscription and perform commodity purchasing activities through the home page provided by the commodity seller, and obtain various pieces of information, such as management situations and the present sales conditions of commodities provided through the commodity seller terminal 30. The commodity seller terminal 30 is used to update the home page on the Internet managing system 20 and provide various pieces of information to the commodity purchaser.

Further, the mail server 60 is used to provide management information, such as the present purchasing situations of commodities, the contribution level of the commodity purchaser, and the total number of commodities sold to the commodity purchaser, and various pieces of information provided by the commodity seller, to the commodity purchaser in real time.

Figure 2:
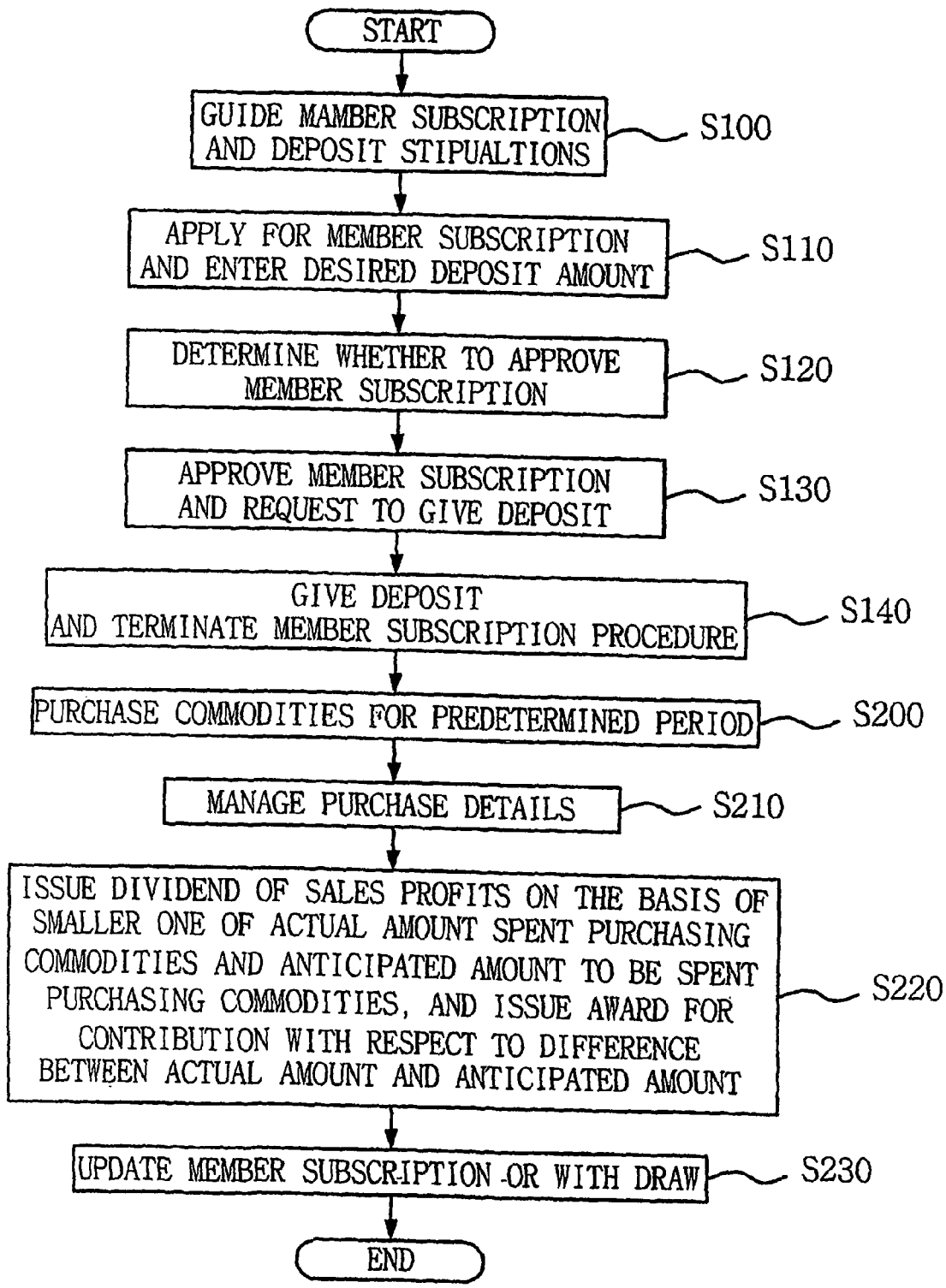
FIG. 2 is a flowchart of the method of selling commodities and sharing sales profits using the Internet according an embodiment of the present invention.

Hereinafter, the method of selling commodities and sharing sales profits of the present invention using the above-described on-line system is described. FIG. 2 is a flowchart of the method of selling commodities and sharing sales profits using the Internet according to an embodiment of the present invention. As shown in FIG. 2, the commodity seller guides stipulations and information related to member subscriptions, deposits, etc., to each user through the home page provided by the Internet managing system 20 at step S100. The commodity purchaser applies for member subscription and enters the desired deposit amount corresponding to the anticipated amount to be spent purchasing commodities for a predetermined period with reference to the information disclosed on the home page provided through the Internet managing system 20 at step S110. The application for member subscription is preferably performed through the commodity purchaser terminal 10 and the Internet 40, but may be performed by fax, telephone, etc. Typically, the application for member subscription is performed by allowing the commodity purchaser to enter a purpose of member subscription, together with items used to identify a user, such as a name, a resident registration number and an address of the commodity purchaser, and items related to communication, such as a telephone number, an email address and a place of residence, and transmitting the entered items to the commodity seller. The desired deposit amount, which corresponds to the amount of money with which the commodity purchaser can spend on purchasing commodities for a predetermined period, for example, one year, is determined by the commodity seller. For example, as shown in FIG. 3, the desired deposit amount can be determined in such a way that, if the anticipated amount that can be spent purchasing commodities for one year is five million won, the desired deposit amount is ten million won, and if the anticipated amount to be spent purchasing commodities is ten million won, the desired deposit amount is twenty million won. Such a desired deposit amount becomes the basis for determining a dividend of sales profits together with a contribution level evaluated according to the later purchase of commodities, so that the desired deposit amount is determined to be proportional to the anticipated amount to be spent purchasing commodities. Further, if the desired deposit amount is set to be excessively lower or higher than the purchasing power of the commodity purchaser, the refund of sales profits is adjusted not to be high.

The commodity seller receives the application for member subscription through various methods, such as the Internet 40 or fax, and then determines whether to approve the member subscription of a corresponding commodity purchaser by examining the qualifications of the commodity purchaser at step S120. If it is determined that the member subscription of the commodity purchaser is approved, the commodity seller informs the commodity purchaser of the approval of member subscription through the mail server 60, and then requests the commodity purchaser to give the desired deposit amount as a deposit at step S130. In this case, the commodity seller determines to approve or disapprove the member subscription by determining whether the commodity purchaser has certain purchasing power on the basis of identification information of the commodity purchaser, received at the time of application for member subscription. Further, if necessary, the commodity seller can ascertain the credit of the commodity purchaser (an applicant for member subscription) using credit evaluation data provided from banks, the financial supervisory service, credit card companies, credit information centers, etc. Further, the deposit can be automatically transferred to a bank account opened by the commodity seller from a bank account opened by the member subscription applicant. Alternatively, the deposit can be transferred to the account of the commodity seller in such a way that, if a credit card number of the member subscription applicant is entered, the credit card number is inquired through a computer network of a bank to ascertain the credit rating of the member subscription applicant, and then the deposit is charged from a credit card account of the member subscription applicant. In this way, if the deposit is transferred to the account of the commodity seller, the member subscription applying procedure is terminated at step S140.

The commodity purchaser having terminated the application for member subscription in this way accesses the Internet managing system 20 to purchase commodities through the home page provided by the commodity seller at step S200. The application program of the Internet managing system 20 records and manages information, such as details of commodities purchased by the commodity purchaser for a stipulated period, for example, one year; and the amount spent purchasing the commodities in the database 50 at step S210. At this time, a predetermined discount rate can be applied according to the accumulated amount spent purchasing commodities, or the predetermined amount of money preset according to the accumulated amount spent purchasing commodities can be subtracted from a commodity price. For example, as shown in FIG. 4, a discount rate can be applied in such a way that, if the accumulated amount spent purchasing commodities is one million won or above, 3% of the amount to be later spent purchasing a commodity is discounted, if the accumulated amount spent purchasing commodities is two million won or above, 5% of the amount to be later spent purchasing a commodity is discounted, and if the accumulated amount spent purchasing commodities is five million won or above, 10% of the amount to be later spent purchasing a commodity is discounted.

Figure 5:
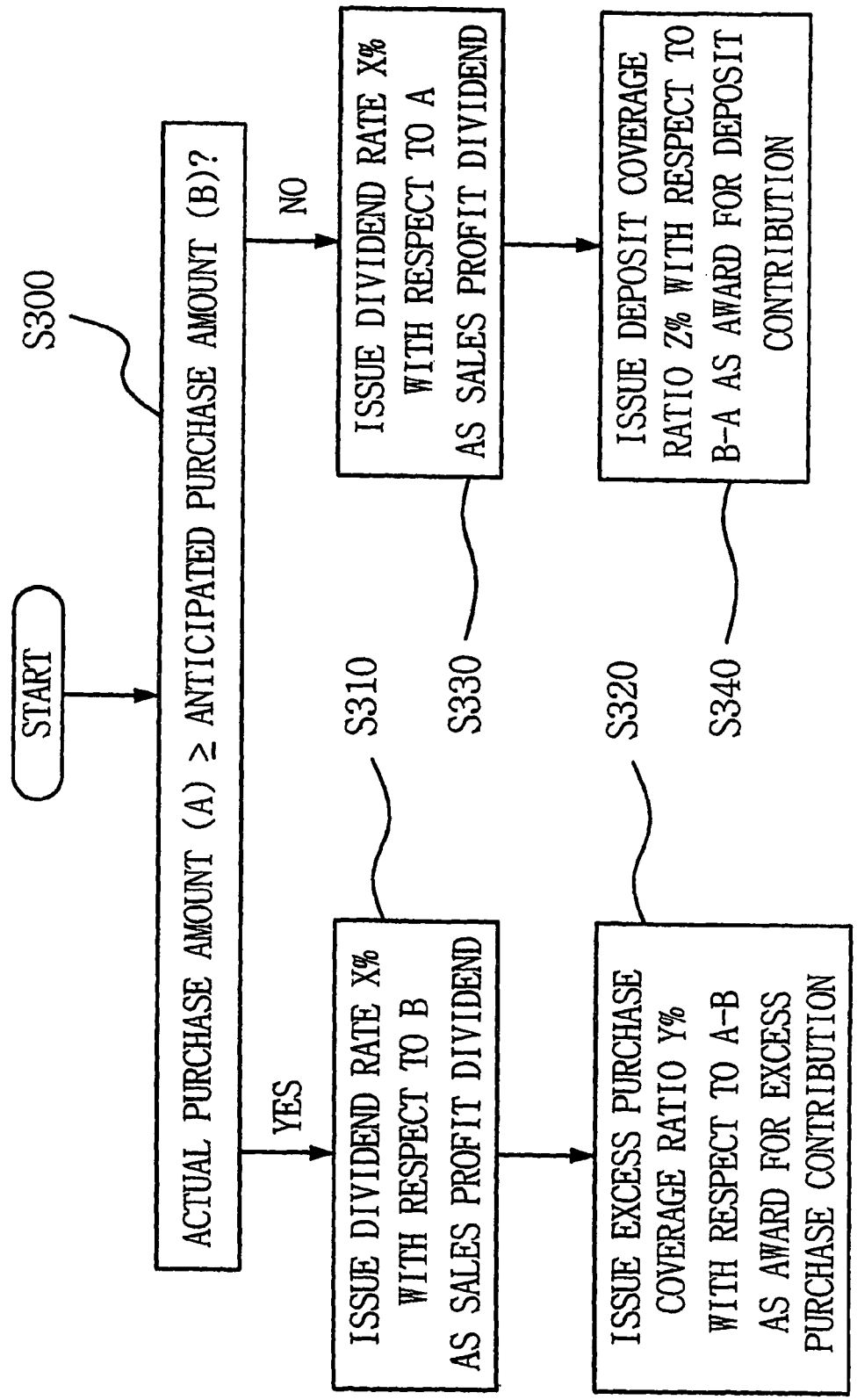
FIG. 5 is a flowchart of a profit sharing procedure applied to the method of selling commodities and sharing sales profits using the Internet according to the present invention.

After the stipulated period initially preset by the commodity purchaser has elapsed, the commodity seller issues to the commodity purchaser a dividend of sales profits corresponding to the purchase of commodities as a refund depending on a stipulated rate on the basis of the smaller one of the actual amount spent purchasing commodities and the anticipated amount to be spent purchasing commodities. With respect to a difference between the actual amount spent purchasing commodities and the anticipated amount to be spent purchasing commodities, an award for contribution proportional to the difference is issued to the commodity purchaser at step S220. Such a profit sharing procedure is described in detail with reference to FIG. 5. First, it is determined whether the actual amount A spent purchasing commodities is equal to or greater than the anticipated amount B to be spent purchasing commodities (that is, $A \geq B$?) at step S300. At this time, if the actual amount A spent purchasing commodities is equal to or greater than the anticipated amount B to be spent purchasing commodities, a dividend of sales profits calculated depending on a set stipulated rate X (that is, a dividend rate) with respect to the anticipated amount B to be spent purchasing commodities is issued to the commodity purchaser as a refund at step S310. Further, with respect to a difference obtained by subtracting the anticipated amount B to be spent purchasing commodities from the actual amount A spent purchasing commodities, an award for contribution to excess purchases, calculated according to a predetermined excess purchase coverage ratio Y, is issued to the commodity purchaser at step S320. On the contrary, if the actual amount A spent purchasing commodities is less than the anticipated amount B to be spent purchasing commodities, a dividend of sales profits calculated depending on the set stipulated rate X (that is, the dividend rate) with respect to the actual amount A spent purchasing commodities is issued to the commodity purchaser as a refund at step S330. Further, with respect to a difference obtained by subtracting the actual amount A spent purchasing commodities from the anticipated amount B to be spent purchasing commodities, an award for contribution to the deposit is issued to the commodity purchaser depending on a predetermined deposit coverage ratio Z at step S340. The above-described dividend rate X, the deposit coverage ratio Z and the excess purchase coverage ratio Y can be varied along an initially set stipulated period, the open market rate, the amount of deposit, the total amount of money obtained by selling commodities and/or the amount spent purchasing commodities by the commodity purchaser. Further, it is preferable that the deposit coverage ratio Z is set to be greater than the excess purchase coverage ratio Y, thus relatively increasing a refund according to the deposit compared to a refund according to the excess purchase of commodities.

Figure 6:
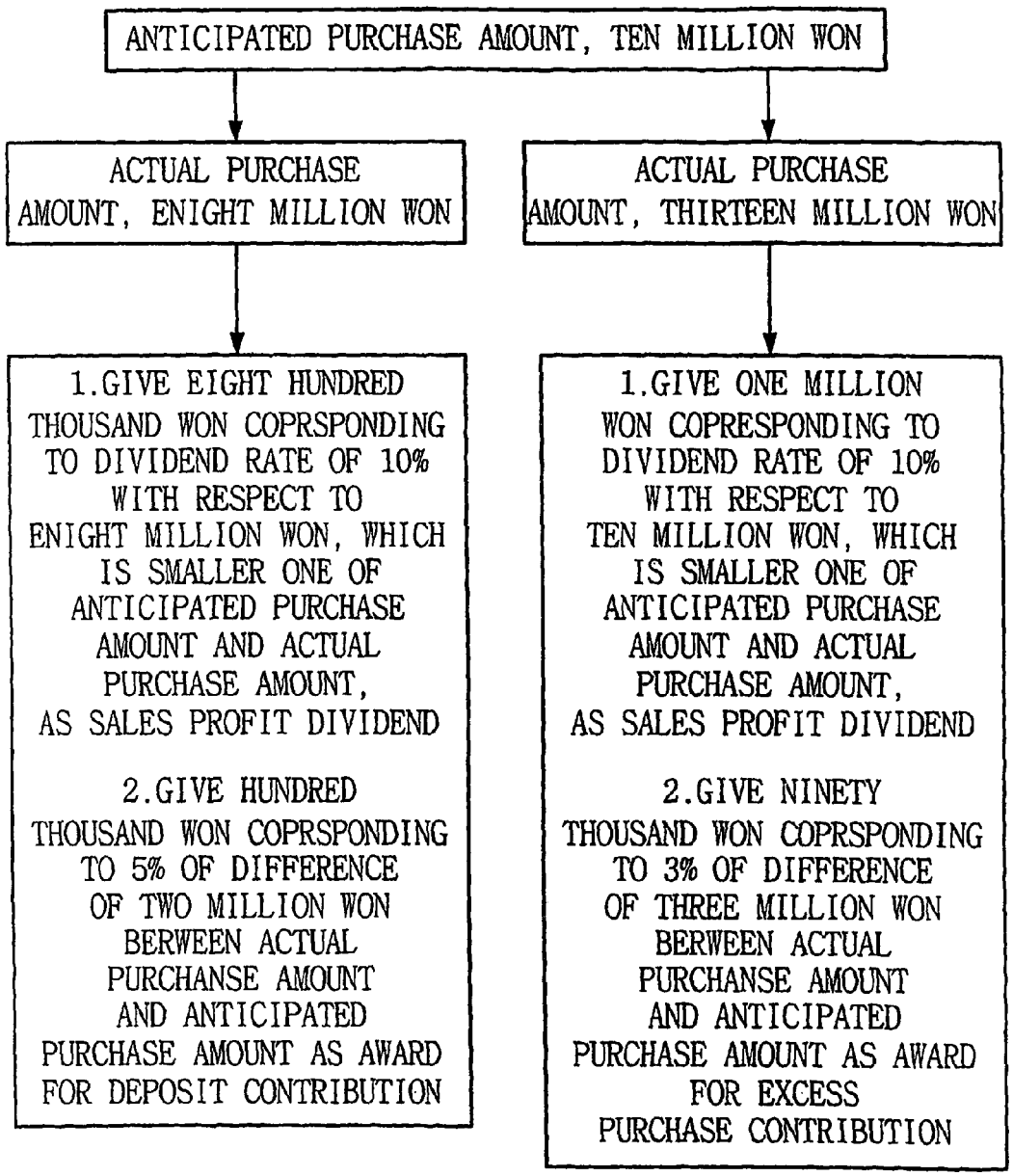
FIG. 6 is a view showing, in detail, the profit sharing procedure applied to the method of selling commodities and sharing sales profits using the Internet according to the present invention.

For example, as shown in FIG. 6, it is assumed that the anticipated amount to be spent purchasing commodities is ten million won, the deposit is ten million won and the actual amount spent purchasing commodities is eight million won. At this time, eight hundred thousand won is given to the commodity purchaser as the sales profit dividend with respect to eight-million won, which is the smaller one of the anticipated amount to be spent purchasing commodities and the actual amount spent purchasing commodities, if the initially set stipulated rate (the dividend rate) is 10%. Further, with respect to the remaining two million won not spent purchasing commodities, a hundred thousand won is given to the commodity purchaser as the award for deposit contribution if the deposit coverage ratio is 5%. Therefore, in this case, the commodity purchaser is given nine hundred thousand won obtained by adding the sales profit dividend to the award for deposit contribution after the stipulated period has elapsed. In the meantime, it is assumed that the anticipated amount to be spent purchasing commodities is ten million won and the actual amount spent purchasing commodities is thirteen million won. At this time, one million won is given to the commodity purchaser as the sales profit dividend with respect to ten million won, which is the smaller one of the anticipated amount to be spent purchasing commodities and the actual amount spent purchasing commodities, if the initially set dividend rate is 10%. Further, with respect to the remaining three million won exceeding the anticipated amount, ninety thousand won is given to the commodity purchaser as the award for excess purchase contribution, if the excess purchase coverage ratio is 3%. Therefore, in this case, the commodity purchaser is given one million and ninety thousand won obtained by adding the sales profit dividend to the award for excess purchase contribution after the stipulated period has elapsed.

Referring to FIG. 2, if the sharing of sales profits obtained for the stipulated period has been completed through the above procedure, the commodity purchaser can maintain business relations by updating the details of member subscriptions, or terminate business relations by performing member withdrawal and withdrawing the deposit at step S230. At this time, the update of details of member subscription can be performed in such a way that previously contracted contents, such as a stipulated period or a deposit, are maintained without change if the commodity purchaser does not express separate intentions.

The method of selling commodities and sharing sales profits of the present invention can sell commodities including fixed properties, such as apartments, buildings and land, and various securities, such as golf memberships, medical treatments, condominiums, health club memberships, travel tickets, traffic tickets for airplanes/trains/buses/ships, admission tickets for movie theaters/theaters/sports, and hotel use, as well as movable properties including various electronic appliances, such as televisions, audio players, video players, Digital Versatile Disk (DVD) players and computers, various daily commodities, such as cosmetics, clothes, decorations and foods, books, vehicles, jewels, art objects, antique objects, necessary articles for marriage, machines, tools, and sports goods.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As described above, the present invention provides a method of selling commodities and sharing sales profits using the Internet, which is constructed so that, if a commodity purchaser deposits the predetermined amount of money and is given a sales profit dividend and an award for contribution depending on the amount spent purchasing commodities, actions of purchasing commodities by the commodity purchaser are directly reflected on the profits of the commodity purchaser, so that the commodity purchaser can unify commodity purchasing paths, thus enabling the commodity purchaser and the commodity seller to reliably maintain continuous business relations therebetween. Further, the present invention is advantageous in that the commodity purchaser gives the amount of money suitable for an ability thereof, such as economic scale, as a deposit for the anticipated amount to be spent purchasing commodities, and obtains predetermined profits from the deposit, so that the commodity purchaser can obtain information regarding the allocation of investments suitable for the ability thereof, thus securing his or her livelihood from the place. Further, as described above, the commodity seller can establish continuous business relations with the commodity purchaser and secure a predetermined deposit in advance, so that the commodity seller can extend distribution industry with a low fund investment, and research and develop higher-quality products by the smooth circulation of funds, thus contributing to the production of high-quality commodities.

The invention claimed is:

1. A method of selling commodities and sharing sales profits, in which an Internet managing system of a commodity seller for electronic commerce is connected to terminals of both at least one commodity purchaser and the commodity seller to sell commodities and to share sales profits obtained from sold commodities to the commodity purchaser, comprising:

accessing the Internet managing system of the commodity seller through the Internet by the commodity purchaser, to apply for member subscription and enter a desired deposit amount corresponding to an anticipated amount to be spent purchasing commodities for a predetermined period, with reference to various stipulations and information related to member subscription and deposits guided through a home page provided by the commodity seller;

approving member subscription of the commodity purchaser by the Internet managing system of the commodity seller, by examining qualifications thereof through the Internet, informing the commodity purchaser of approval of the member subscription in real time through a mail server, requesting the commodity purchaser to give the desired deposit amount as a deposit, and automatically transferring the deposit to an account of the commodity seller;

accessing the Internet managing system by the commodity purchaser, to purchase commodities provided by the commodity seller for a predetermined stipulated period; and issuing to the commodity purchaser by the Internet managing system of the commodity seller, a dividend of sales profits corresponding to a predetermined dividend rate according to purchase of commodities on the basis of a smaller one of an actual amount spent purchasing commodities and an anticipated amount to be spent purchasing commodities, as a refund, after the stipulated period initially set by the commodity purchaser through the Internet has elapsed, and issuing to the commodity purchaser an award for contribution corresponding to a predetermined coverage ratio of a difference between the actual amount spent purchasing commodities and the anticipated amount to be spent purchasing commodities with respect to the difference.

2. The method of selling commodities and sharing sales profits according to claim 1, wherein the stipulated period for which commodities are purchased is one year.

3. The method of selling commodities and sharing sales profits according to claim 1, wherein said issuing to the commodity purchaser by the Internet managing system of the commodity seller, a dividend of sales profits comprises differently applying discount rates at the time of purchasing commodities depending on an accumulated amount spent purchasing commodities by the commodity purchaser for a predetermined period.

4. The method of selling commodities and sharing sales profits according to claim 1, wherein said issuing to the commodity purchaser by the Internet managing system of the commodity seller, a dividend of sales profits comprises:

determining whether the actual amount spent purchasing commodities is equal to or greater than the anticipated amount to be spent purchasing commodities;

issuing to the commodity purchaser a dividend of sales profits, calculated depending on a predetermined dividend rate with respect to the anticipated amount to be spent purchasing commodities, as a refund, and issuing to the commodity purchaser an award for contribution to excess purchases, calculated according to a predetermined excess purchase coverage ratio with respect to an actual amount exceeding the anticipated amount to be spent purchasing commodities, if the actual amount spent purchasing commodities is equal to or greater than the anticipated amount to be spent purchasing commodities; and issuing to the commodity purchaser a dividend of sales profits, calculated depending on a predetermined dividend rate with respect to the actual amount spent purchasing commodities, as a refund, and issuing to the commodity purchaser an award for contribution to the deposit, calculated according to a predetermined deposit coverage ratio with respect to an anticipated amount exceeding the actual amount spent purchasing commodities, if the actual amount spent purchasing commodities is less than the anticipated amount to be spent purchasing commodities.

5. The method of selling commodities and sharing sales profits according to claim 4, wherein the deposit coverage ratio is greater than the excess purchase coverage ratio.

6. The method of selling commodities and sharing sales profits according to claim 1, wherein said issuing to the commodity purchaser by the Internet managing system of the commodity seller, a dividend of sales profits comprises updating details of member subscriptions of the commodity purchaser to maintain business relations between the commodity seller and the commodity purchaser.

* * * * *